Dec. 19, 1967  E. BERGSTROM  3,358,966
APPARATUS FOR USE IN LAYING PIPE LINES
Filed Aug. 18, 1966  4 Sheets-Sheet 2

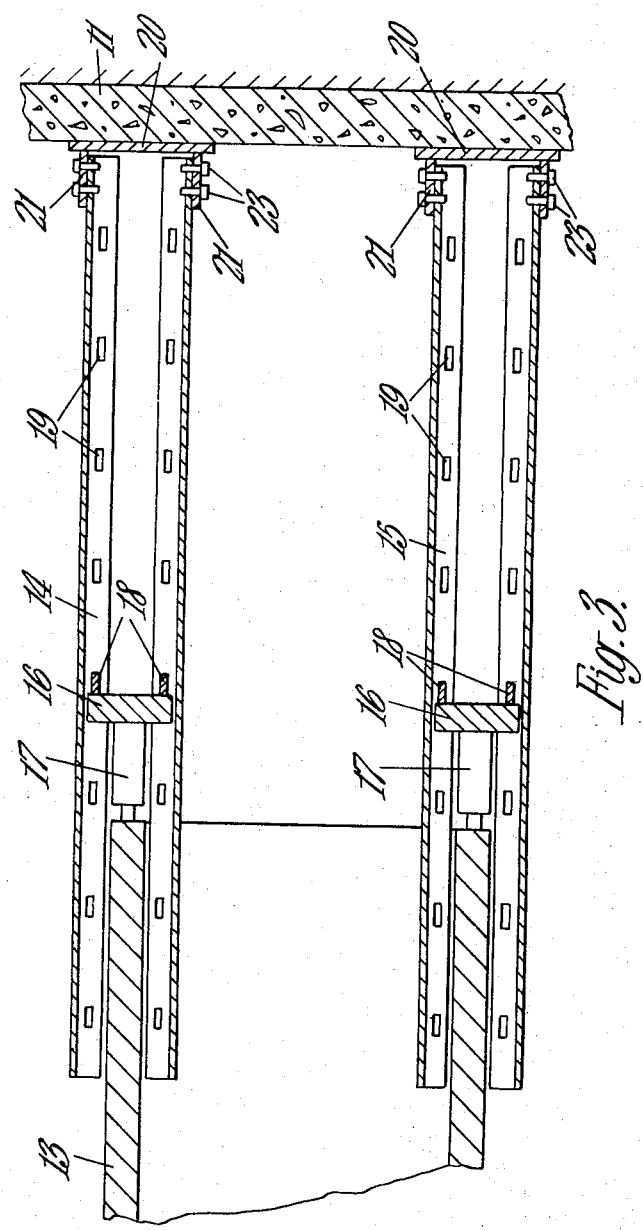

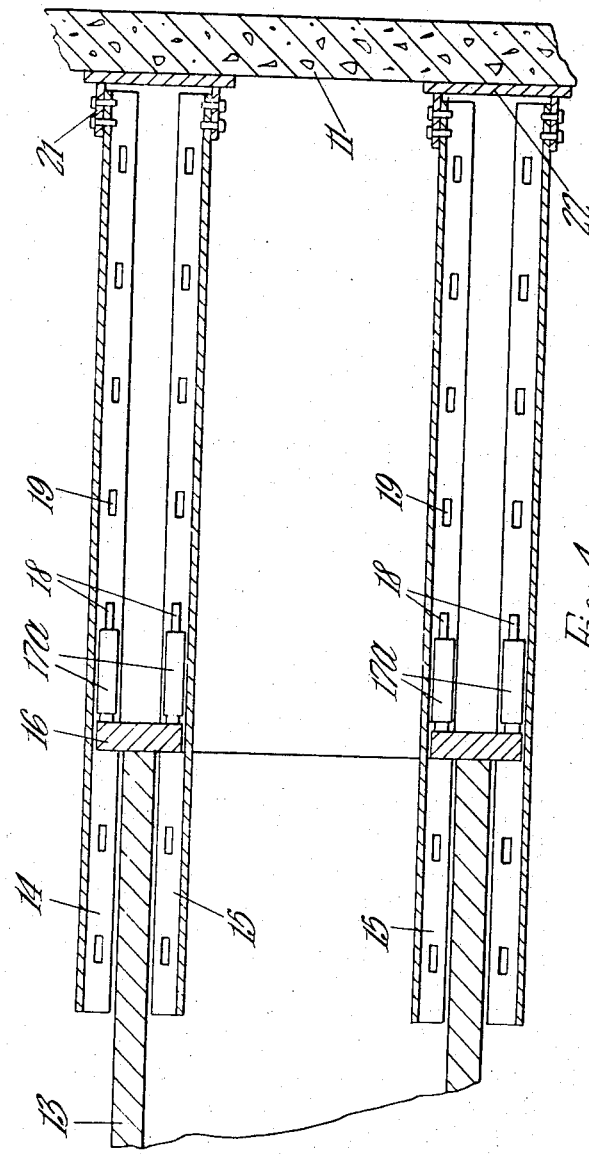

United States Patent Office 3,358,966
Patented Dec. 19, 1967

3,358,966
APPARATUS FOR USE IN LAYING
PIPE LINES
Erik Bergstrom, 34 Arran Gardens, Barassie,
Troon, Scotland
Filed Aug. 18, 1966, Ser. No. 573,414
Claims priority, application Great Britain,
Aug. 25, 1965, 36,452/65
3 Claims. (Cl. 254—29)

ABSTRACT OF THE DISCLOSURE

The provision in a thrust pit of means for driving pipe lengths into the ground comprising at least two rails extending from the back of the thrust pit axially of and along the exterior of the pipe length being driven, a further rail associated with each of said rails and positioned to extend axially along the interior of the pipe length, at least one hydraulic jack carried by each pair of rails and which jacks, when activated, transmit their pressure to the end of the pipe line, and means located at the rear of the jacks to take the back thrust thereof, said means being supported by and adjustable step by step along the rails.

This invention has reference to apparatus for laying pipe lines formed of a series of aligned pipe lengths by the method which consists in forcing the pipe lengths, one after the other, through the ground by means of an hydraulic jack or jacks positioned in what is referred to as a thrust pit.

It has been proposed to provide in a thrust pit an apparatus whereby pipe lengths can be forced into the ground by the method set forth said apparatus comprising a pair of parallel side rails extending from the rear of the thrust pit, hydraulic jacks carried by the rails, means carried by the rails to take the back thrust of the jacks which means can be advanced step by step along the rails and anchored thereto at each step, and a cross member extending over the end of the pipe length being driven into the ground such cross member taking the thrust of the jacks and transmitting it to the pipe length.

Such apparatus is quite satisfactory in driving pipe lengths which are not of large diameter but in driving pipes of large diameter, say six feet and more, the cross member is liable to distortion unless made excessively strong and therefore excessively heavy and the present invention has for its object to provide improvements in such apparatus whereby the pipe lengths can be driven into the ground without the necessity of providing the aforesaid cross member.

The invention consists in providing a thrust pit for driving pipe lengths into the ground comprising two or more pairs of rails extending from the rear of the thrust pit, one rail of each pair being positioned to extend along the outside of the pipe length being driven and the other along the inside of the pipe, the pairs being uniformly spaced apart circumferentially of the pipe, a jack supported by each pair of rails and means which can be advanced step by step along each pair of rails to take the back thrust of the jacks.

The jacks may be supported by short cross heads extending between the means which take the back thrust of the jacks, each jack being then in alignment with the end of the pipe length to which it applies its thrust.

Alternatively each of the two rails of each pair may carry a jack and the thrust of each pair transmitted to a cross head which in turn bears on the end of the pipe being driven.

Preferred embodiments of the invention will now be described with reference to the accompanying drawings wherein:

FIGURE 3 is a section on the line 3—3 of FIGURE 2 and

FIGURE 4 is a view corresponding to FIGURE 3 of a modified construction of the apparatus shown in FIGURES 1 to 3.

Figure 1:
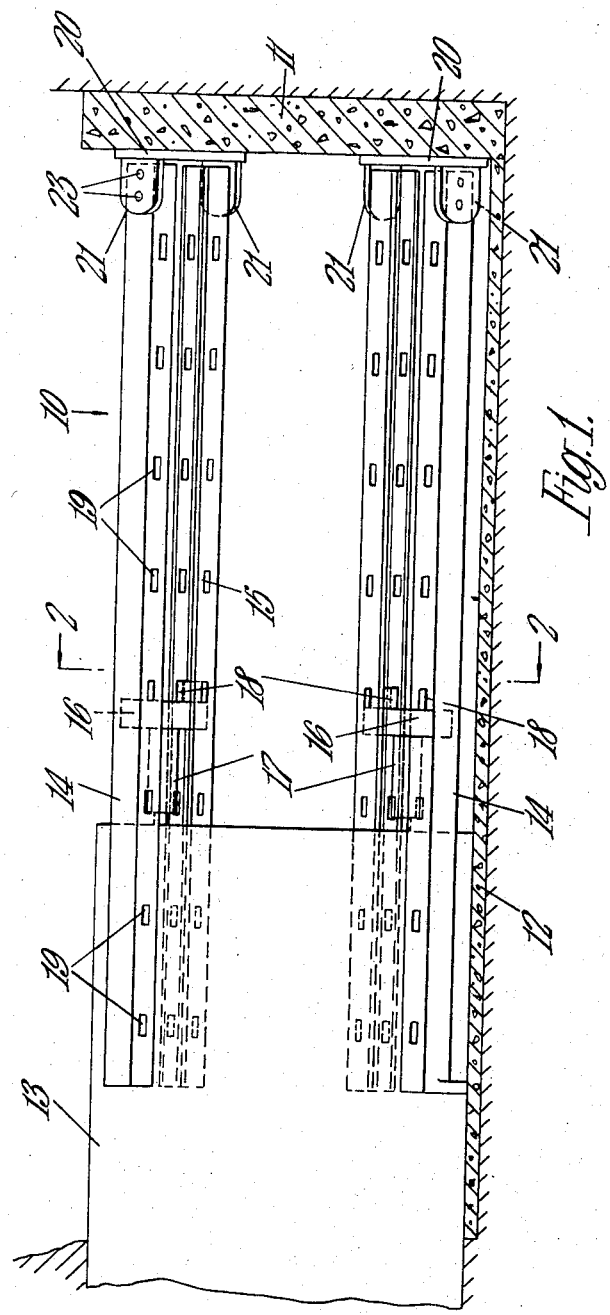
FIGURE 1 is a sectional elevation of a thrust pit showing a pipe length being driven into the ground by apparatus in accordance with the invention.

In the drawings, 10 denotes a thrust pit for driving pipe lines into the ground, 11 denotes the concrete back of the pressure pit, 12 denotes the concrete base of the thrust pit and 13 denotes a pipe length being driven into the ground.

Figure 2:
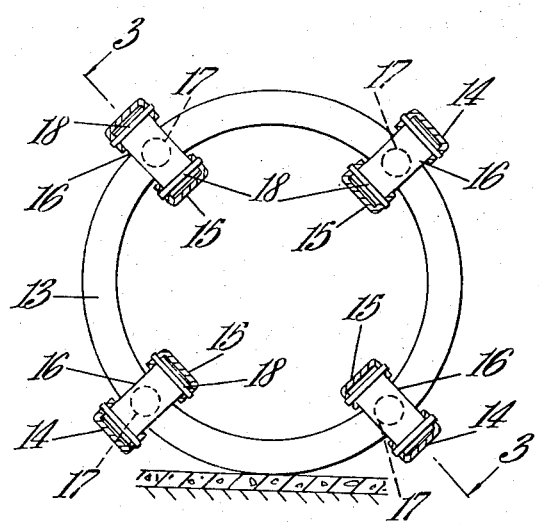
FIGURE 2 is a section on the line 2—2 of FIGURE 1.

Reference will now be made particularly to FIGURES 1 to 3.

Located within the thrust pit are four pairs of parallel rails, one rail, designated 14, of each pair being positioned to extend axially along and closely adjacent to the outer side of a pipe length 13, the other, designated 15, positioned to extend axially closely along the inner side thereof and the four pairs so positioned that they are equally spaced apart circumferentially around the pipe. Each rail is of channel section and the channels of each pair are opposed to each other. Slidable in each pair of opposed channels is a cross head 16 which carries a centrally positioned hydraulic jack 17 and the four jacks apply their thrust directly on the end of the pipe lengths 13. Thus a thrust is applied directly to the end of the pipe length at points evenly spaced apart circumferentially.

The back thrust of each jack is taken by keys 18 inserted in holes 19 provided in the flanges of the rails, the cross heads bearing on the keys. Each rail is provided with a series of such holes and after the jacks have been extended to apply their thrust to the pipe length and force it into the ground to an extent corresponding to their stroke they are retracted. The cross heads with jacks are then advanced and the keys 18 inserted in the next holes to take the back thrust when the jacks are again extended.

Each pair of rails may be carried by a base plate 20 adjustably anchored to the back of the thrust pit so that they can be positioned to suit the diameter of the pipe being driven. Further each outer rail may be hinged or removably attached to its base plate or to brackets projecting therefrom and each inner rail is removable so that all the rails can be moved to a position in which they will not obstruct the introduction of the pipe length into the thrust pit.

In the drawings the rails are supported by lugs 21 projecting from base plates 20 secured to the back of the thrust pit, a pair of pins 23 inserted through holes in each lug and in the rail associated therewith anchoring the rails to the base plates. On removing both pins anchoring a rail the rail can be removed and by removing only one pin the other pin acts as a pivot to enable the rail to be swung outwards and thereby permits of the introduction of a further pipe length into the pit.

In the modification shown in FIGURE 4 the rails 14 and 15 with their holes 19, keys 18 and cross heads 16 are as described with reference to FIGURES 1 to 3 but the cross heads bear directly on the end of the pipe length. The thrust is exerted on each cross head by means of two hydraulic jacks 17a which are housed in the opposed channels of the pairs of rails, the back thrust being taken by the keys. When the jacks are activated their thrust is transmitted through the cross heads to drive the pipe length into the ground to an extent corresponding to the strokes of the jacks, thereafter the jacks are retracted and advanced along the channels of the rails and the keys withdrawn and advanced into the next holes to take the back thrust of the jacks when they are again activated. Thus the pipe length can be driven step by step into the ground until it is necessary to introduce a further pipe length into the ground.

In all arrangements the rails are removably or hingedly secured to base plates which bear on the back of the thrust pit. Further the rails may be adjustably mounted on the base plates, or the base plates may be adjustable on the back of the pit to suit the diameter of the pipe length.

What I claim is:

1. The provision in a thrust pit of means for driving pipe lengths into the ground comprising at least two rails extending from the back of the thrust pit axially of and along the exterior of the pipe length being driven, a further rail associated with each of said rails and positioned to extend axially along the interior of the pipe length, at least one hydraulic jack carried by each pair of rails and which jacks, when activated, transmit their pressure to the end of the pipe line, and means located at the rear of the jacks to take the back thrust thereof, said means being supported by and adjustable step by step along the rails.

2. The provision in a thrust pit of an apparatus as claimed in claim 1 having a cross head extending between each inner and outer rail, a single jack introduced between each cross head and the end of the pipe being driven and means at the rear of each cross head to take the back thrust of the jacks, said means being supported by and adjustable step by step along the rails.

3. The provision in a thrust pit of an apparatus as claimed in claim 1 wherein each rail carries a jack, a cross head extending between each pair of jacks carried by each pair of rails and through which the thrust of the jacks is transmitted to the pipe and means located at the rear of each jack to take the back thrust thereof, said means being supported by and adjustable step by step along each rail.

References Cited

UNITED STATES PATENTS

| | | | |
|---|---|---|---|
| 1,948,707 | 2/1934 | Gilman | 61—85 |
| 2,656,683 | 10/1953 | Riva | 61—72.7 |

FOREIGN PATENTS 363,368  9/1962  Switzerland.

MILTON S. MEHR, *Primary Examiner.*